United States Patent
Mushiake et al.

[11] Patent Number: 6,134,760
[45] Date of Patent: Oct. 24, 2000

[54] PROCESS FOR MANUFACTURING ELECTRIC DOUBLE LAYER CAPACITOR

[76] Inventors: Naofumi Mushiake, Taniguchi Dai-3-Mansion 501, 102, Kanemoto, Okayama-Shi, Okayama-Ken 703; Koshi Inoue, 2495, Era, Yakage-Cho, Oda-Gun, Okayama-Ken 714-12, both of Japan

[21] Appl. No.: 09/158,376

[22] Filed: Sep. 22, 1998

[51] Int. Cl.[7] ....................................................... H01G 9/00
[52] U.S. Cl. ........................... 29/25.03; 361/502; 361/500
[58] Field of Search ................................. 29/25.03, 25.01, 29/25.02; 438/381, 386, 387, 393, 396, 800; 257/906, 924; 361/502, 500

[56] References Cited

U.S. PATENT DOCUMENTS

| | | | |
|---|---|---|---|
| 4,327,400 | 4/1982 | Muranaka et al. | 361/433 |
| 4,862,328 | 8/1989 | Morimoto et al. | 361/502 |
| 5,150,283 | 9/1992 | Yoshida et al. | 361/502 |
| 5,682,288 | 10/1997 | Wani | 361/502 |
| 5,706,165 | 1/1998 | Saito et al. | 361/502 |

FOREIGN PATENT DOCUMENTS

| | | |
|---|---|---|
| 0 617 441 A1 | 9/1994 | European Pat. Off. . |
| 54-012620 | 5/1979 | Japan . |
| 8-148388 | 6/1996 | Japan . |

*Primary Examiner*—Chandra Chaudhari
*Assistant Examiner*—Craig Thompson
*Attorney, Agent, or Firm*—Allan M. Wheatcraft

[57] ABSTRACT

A plurality of polarizable electrodes, a laminate of a collector layer, a polarizable electrode layer of a porous sheet, and a carbon-based conductive material interposed therebetween, are disposed in a row arrangement, interposing separators between the polarizable electrodes, and an electrolyte is packed between said polarizable electrodes and said separators; the carbon-based conductive material penetrating into the voids in the polarizable electrode layers. A process is provided whereby the polarizable electrode is manufactured by applying a conductive material solution to the collector and/or polarizable electrode sheet surface, superposing the two, and then evaporating out the dispersion medium of the conductive material solution.

2 Claims, 3 Drawing Sheets

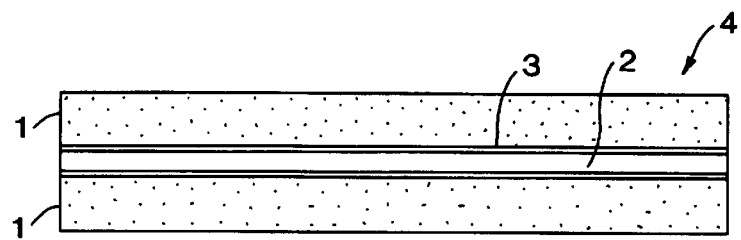
FIG. 1
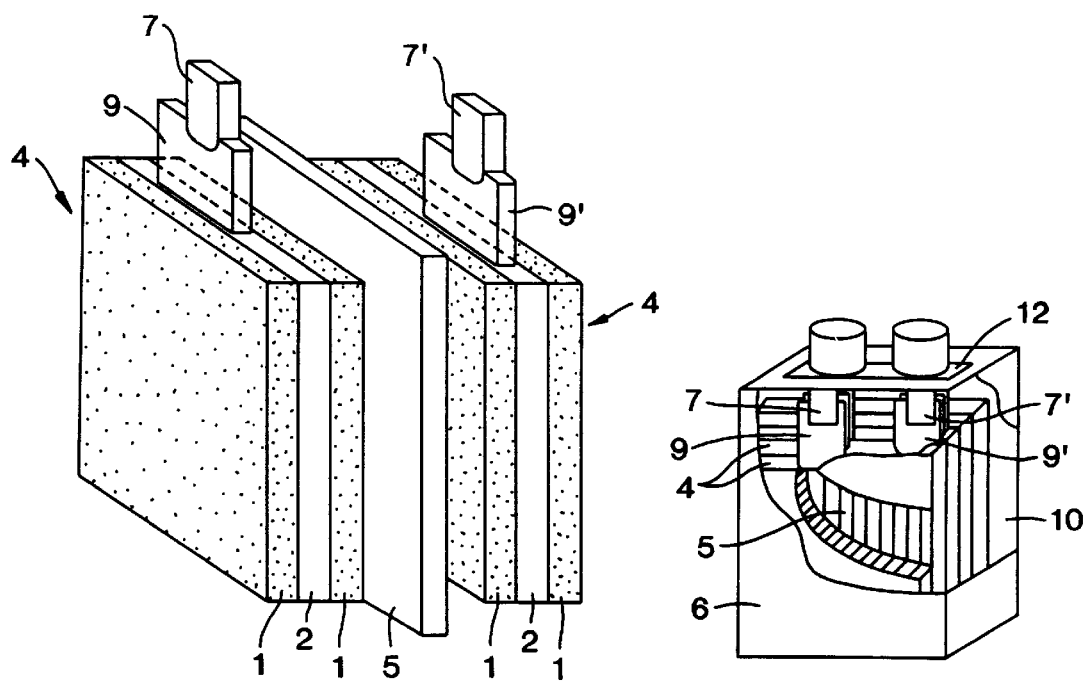
FIG. 2
FIG. 3

PROCESS FOR MANUFACTURING ELECTRIC DOUBLE LAYER CAPACITOR

FIELD OF THE INVENTION

The present invention relates to an electric double layer capacitor which employs polarizable electrodes comprising well-integrated polarizable electrode and collector layers, and to a method for manufacturing such a capacitor.

BACKGROUND OF THE INVENTION

Conventional electric double layer capacitors come in various types. Examples are coin and button types, in which the separator is interposed between the pair of electrodes, and this, together with the electrolyte, is sealed within a metal case, a sealing plate, and a gasket that insulates the two from each other; coil types, in which the electrodes and separator are coiled to produce an electric double layer capacitor unit, which is then placed in a metal case and impregnated with the electrolyte; and stacked types in which a plurality of rectangular electrodes and separators interposed between the electrodes are superposed in alternating fashion to produced an electrode laminate, a positive electrode lead is connected to the positive terminal and a negative electrode lead is connected to the negative terminal to produce a electric double layer capacitor unit, which is then placed in a metal case, impregnated with the electrolyte, and sealed.

Electric double layer capacitors for use in power applications such as automobiles must possess energy densities so as the achieve both high capacitance and low internal resistance, and must also exhibit high output densities. With the goal of meeting these requirements, research is being conducted into ways to produce thinner films and increase surface area so as to increase the opposing electrode area. It is also necessary for the electrodes to have integrated collectors. Mass production is a further requirement of electric double layer capacitor.

The electrodes used in conventional electric double layer capacitors are ordinarily manufactured by (1) a process in which a mixture of paste or ink form containing the electrode material is applied to the collector by coating or other means, dried (solvent removal), and then calendered or the like, or (2) a process in which a sheet which will serve as the electrode material is first prepared, and this is then integrated with the collector using a calender roll or the like. The largest drawback of these methods is the questionable ability to produce good contact between the collector and the electrode material powder. Techniques effective for producing an electric double layer capacitor having good contact between the collector and the electrode material and exhibiting low internal resistance include increasing the contact area and creating adequate interpenetration between the collector and the electrode material.

Specific examples of processes falling under (1) are a method in which a paste consisting of activated carbon powder, a fluoropolymer, and methyl alcohol is coated onto an aluminum net which serves as the collector (Japanese Laid-Open Patent Application 4-162510); a method in which a slurry prepared by adding an aqueous solution of carboxymethyl cellulose to a mixed solution containing activated carbon powder, acetylene black, water, and methanol is applied to the roughened surface of aluminum foil serving as the collector (Japanese Laid-Open Patent Application 4-162510); and a method in which a mixture of polyvinyl pyrrolidone and an aqueous dispersion of polytetrafluoroethylene is added as a binder to activated carbon powder and acetylene black, and this is applied to aluminum expanded metal which serves as the collector (U.S. Pat. No. 4,327,400). Specific examples of processes falling under (2) are a method in which an electrode material sheet is prepared from activated carbon powder, a conductive agent, and polytetrafluoroethylene used as binder to bind, the electrode material sheet is superposed on a collector consisting of a metal foil with a surface roughened by etching, an expanded metal, or other material, and is then fed through a calender roll to produce a thin electrode (Japanese Patent Publication 54-12620).

Since the electrode material is actually a powder aggregate, its surface may be imagined as having extremely tiny peaks and valleys. Accordingly, contact between the collector surface and the electrode surface occurs in a point-contact configuration. Where the surface of the metal foil serving as the collector has been roughened, the increased surface area reduces the internal resistance of the electric double layer capacitor.

However, contact area cannot be considered to reach adequate levels, even where the collector surface has been roughened. The bonding strength between the electrode material sheet and the collector is not adequate to withstand the feed tension and winding during continuous production of electrodes in roll form, and contact tends to weaken over time.

In a collector consisting of expanded metal or the like provided with openings, contact is improved by causing the electrode material to penetrate into the openings provided in the collector. However, increasing the opening size to facilitate penetration has the effect of reducing strength and reducing the unit cross section of the collector, thereby increasing resistance of the collector. Thus, the effect in reducing the internal resistance of the electric double layer capacitor is less than anticipated.

The present invention was developed with the foregoing in view, and is intended to provide an electric double layer capacitor exhibiting low internal resistance, provided with polarizable electrodes in which the collector and the electrode material are securely integrated in such as way as to produce adequate bonding strength and good contact.

SUMMARY OF THE INVENTION

The electric double layer capacitor which pertains to the present invention is an electric double layer capacitor provided with a plurality of polarizable electrodes disposed in a row arrangement, a collector layer laminated to a polarizable electrode layer that is fabricated from a porous sheet consisting principally of activated carbon; a separator being interposed between said polarizable electrodes; and an electrolyte being packed between said polarizable electrodes and said separator; characterized in that a carbon-based conductive material is interposed while laminating said collector layer and said polarizable electrode layer; and said carbon-based conductive material penetrates into the voids in said polarizable electrode layer. Preferably, the polarizable electrodes disposed in a row arrangement, excepting the two terminal members thereof, include a carbon-based conductive material interposed at both faces of the collector layer while laminating the polarizable electrode layers thereto, and the carbon-based conductive material penetrates into the voids of the polarizable electrode layers.

Preferably, the porosity of the polarizable electrode layer is 40 to 90%, and the maximum pore size is 0.5 to 20 $\mu$m. The collector layer preferably consists of at least one type of metal selected from the group consisting of aluminum, stainless steel, titanium, and tantalum, and taking the form of a foil, plate, sheet, expanded metal, punched metal, or mesh. The carbon-based conductive material preferably consists of a conductive material and a binder. The conductive material is preferably graphite or carbon black. The graphite or carbon black preferably has an average particle size of 0.5 to 50 µm. The binder preferably consists of at least one selected from the group consisting of thermoplastic resins, cellulose derivatives, and water glass.

The method for manufacturing an electric double layer capacitor which pertains to the present invention is characterized by comprising a step in which a carbon-based conductive material solution prepared by dispersing a carbon-based conductive material in a dispersion medium is applied to the polarizable electrode material sheet and/or collector surface; a step in which said polarizable electrode material sheet and said collector are laminated to produced a laminate sheet in which said carbon-based conductive material solution is interspersed; and a step in which the dispersion medium is removed from said carbon-based conductive material solution layer in said laminate sheet.

DESCRIPTION OF THE DRAWINGS

The operation of the present invention should become apparent from the following description when considered in conjunction with the accompanying drawings, in which:

FIG. 1 is an illustration of polarizable electrode constitution in an embodiment of the present invention.

FIG. 2 is a simplified illustration of electric double layer capacitor single unit constitution in an embodiment of the present invention.

FIG. 3 is a simplified illustration of the constitution of an electric double layer capacitor of the present invention employing the unit depicted in FIG. 2.

DETAILED DESCRIPTION OF THE INVENTION

Figure 4:
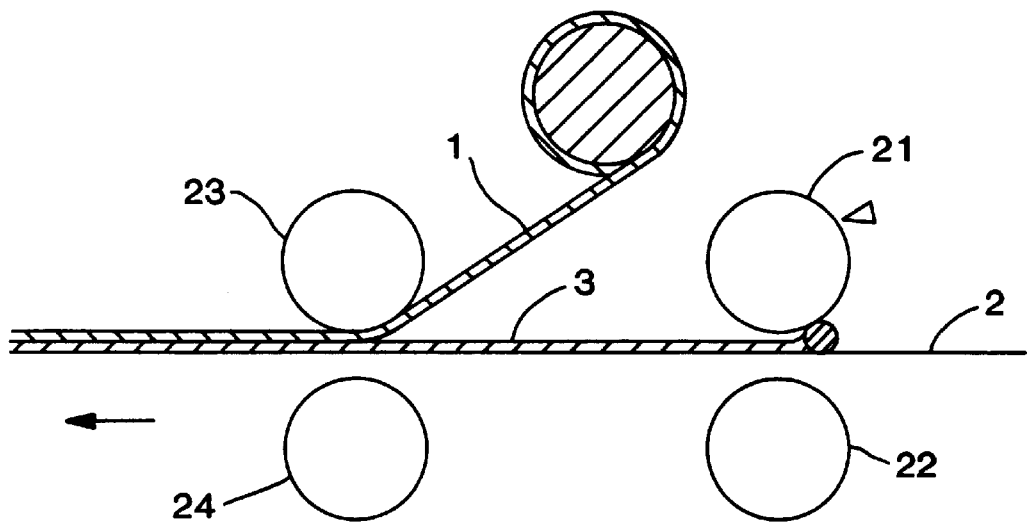
FIG. 4 is a schematic diagram of an embodiment of a process for making the present invention.

First, the polarizable electrode employed in the electric double layer capacitor which pertains to the present invention will be described.

The electric double layer capacitor employed in the present invention is characterized by a collector layer that is laminated on each side to a polarizable electrode layer fabricated from a porous sheet consisting principally of activated carbon, and a separator being interposed between two or more of such collector-electrode assemblies, where an adhesive carbon-based conductive material is disposed between the polarizable electrode layers and the collector and penetrates into the voids in the polarizable electrode layer.

The porous sheet which constitutes the polarizable electrode layer is produced by combining activated carbon powder with suitable carbon black, polytetrafluoroethylene, or other powder, adding ethanol, oil, or the like to the mixture, and then subjecting the product to roll calendering or other process.

The porous sheet which constitutes the polarizable electrode layer has porosity ranging from 40–90%, and preferably 60–80%. Where the porosity is below 40%, the carbon-based conductive material does not readily penetrate into the voids of the polarizable electrode layer. Above 90%, the carbon-based conductive material tends to penetrate depthwise far into the pores of the polarizable electrode layer, with the result that the carbon-based conductive material does not readily stay at the collector-polarizable electrode interface, and the activated carbon pore interiors become covered by the carbon-based conductive material. Capacitor function is impaired as a result. The diameter of the largest pores (maximum pore size) should be 0.5–20 µm. Where the maximum pore size is smaller than 0.5 µm, the carbon-based conductive material does not readily penetrate into the voids of the polarizable electrode layer. Where it exceeds 20 µm, the carbon-based conductive material tends to penetrate depthwise far into the pores of the polarizable electrode layer, with the result that the carbon-based conductive material does not readily stay at the collector-the polarizable electrode interface, and the activated carbon pore interiors become covered by the carbon-based conductive material. Capacitor function is impaired as a result.

The collector layer preferably consists of a metal such as aluminum, stainless steel, titanium, and tantalum. The metal preferably takes the form of a foil, plate, sheet, expanded, punched, or mesh; a foil is especially preferred.

The carbon-based conductive material which is interposed between the polarizable electrode layer and the collector layer has the function of providing electrical connection between collector surfaces on the one hand and the outside and inside surfaces of polarizable electrode layer on the other, as well as a bonding function. In particular, on the polarizable electrode layer side, the carbon-based conductive material penetrates into the pores in the polarizable electrode layer, creating an anchoring effect which improves both bonding strength and conductivity. Accordingly, sufficient electrical connection is provided between the polarizable electrode layer and the collector layer, thereby obviating the need for a process to increase the collector contact area or to provide openings for adequate interpenetration of the collector and the electrode material.

The carbon-based conductive material consists of graphite, carbon black, or other conductive material combined with a binder. Examples of binders are water glass; the sodium salt or ammonium salt of carboxymethyl cellulose, or other cellulose derivative; and polyvinyl alcohol, polyvinyl butyral, polyvinyl acetate, polybis(polybutene), or other thermoplastic resin.

The graphite or carbon black conductive material preferably has an average particle size of 0.5 to 50 µm. Where the average particle size is greater than 50 µm, the carbon-based conductive material does not readily penetrate into the voids of the polarizable electrode layer. Where it is smaller than 0.5 µm, the carbon-based conductive material tends to penetrate depthwise far into the pores of the polarizable electrode layer, with the result that the carbon-based conductive material does not readily stay at the collector-polarizable electrode interface, and the activated carbon particles become covered by the carbon-based conductive material. The activated carbon pore interiors are thus inaccessible, and capacitor function is impaired as a result.

The carbon-based conductive material present in the voids of the polarizable electrode layer should fill up 0.5%–10%, and preferably 1%–5%, of the total void volume in the polarizable electrode layer. Amounts below 0.5% produce a collector layer-polarizable electrode surface contact configuration in which the space other than the points of contact of the powder of the polarizable electrode with the metal foil of the collector layer is not adequately filled in, making it difficult to improve contact area through increased surface contact. Conversely, amounts exceeding 10%, while improving surface contact, can result in activated carbon pore interiors becoming covered by the carbon-based conductive material, impairing capacitor function as a result.

The carbon-based conductive material should penetrate 0.15 to 30%, preferably 0.25 to 15% of the thickness of the polarizable electrode layer as determined by scanning electron microscopy.

A polarizable electrode having the constitution described above can be manufactured by a process like the following.

First, a carbon-based conductive material solution prepared by dispersing the carbon-based conductive material in a dispersion medium is applied to the surface of the sheet which constitutes the polarizable electrode layer (hereinafter termed "polarizable electrode material sheet"), to the collector surface, or to both.

Here, water, a lower alcohol, or the like can be used as the dispersion medium for preparing the carbon-based conductive material solution. The conductive material concentration is preferably 20–30 wt %. The use of a carbon-based conductive material solution having a composition similar to those given in Table 1 is preferred. Favorable results are obtained by selecting an appropriate composition and using it in concentrations that may be further diluted in amounts ranging from 1/1 to 1/30 (and hence up to 30 times as much applied).

|   | Conducing material (avg. particle size) | Binder | Dispersion medium | Other |
|---|---|---|---|---|
| 1 | natural graphite (3 μm) 20–30 wt % | carboxymethyl cellulose Na salt 4–16 wt % | water 50–75 wt % | ammonia several wt % |
| 2 | natural graphite (3 μm) 25–30 wt % | methyl cellulose 5–20 wt % | isopropyl alcohol 45–75 wt % | |
| 3 | natural graphite (3 μm) 25–30 wt % | polyvinyl alcohol 5–20 wt % | isopropyl alcohol 45–75 wt % | |
| 4 | natural graphite (3 μm) 25–30 wt % | polyvinyl butyral 5–20 wt % | isopropyl alcohol 45–75 wt % | |
| 5 | natural graphite (3 μm) 25–30 wt % | polyvinyl acetal 5–20 wt % | isopropyl alcohol 45–75 wt % | |
| 6 | natural graphite (3 μm) 25–30 wt % | polybis(polybutylene) 5–20 wt % | isopropyl alcohol 45–75 wt % | |
| 7 | natural graphite (3 μm) 20–30 wt % | acrylic resin-styrene copolymer 2–8 wt % | water 50–75 wt % | ammonia several wt % |
| 8 | natural graphite (3 μm) 25–30 wt % | water glass 5–20 wt % | water 45–75 wt % | |
| 9 | natural graphite (60 μm) 20–30 wt % | carboxymethyl cellulose Na salt 4–16 wt % | water 50–75 wt % | ammonia several wt % |
| 10 | acetylene black (40 μm) 20–30 wt % | carboxymethyl cellulose Na salt 4–16 wt % | water 50–75 wt % | ammonia several wt % |

The carbon-based conductive material solution can be applied to the lamination face of either the polarizable electrode material sheet or the collector, or applied to both. The preferred method is to apply the solution to at least the lamination face of the collector. The polarizable electrode material sheet is actually a powder aggregate, and peaks and valleys are present over the entire surface of the polarizable electrode material sheet. Thus, by interposing the carbon-based conductive material between the polarizable electrode layer and the collective layer, it is possible to fill in the space other than the points of contact of the powder of the polarizable electrode with the collector, thereby improving contact to the point that it approximates planar contact. However, if the carbon-based conductive material solution is applied to an electrode surface, the carbon-based conductive material solution penetrates into the polarizable electrode material sheet so that a sufficient amount of carbon-based conductive material solution does not remain on the surface of the polarizable electrode material sheet, making it difficult to fill in the space other than the points of contact of the powder of the polarizable electrode with the collector. From a productivity standpoint as well, it is preferably to apply the solution to the collector, which has a higher degree of strength than the polarizable electrode material sheet.

The polarizable electrode material sheet and the collector are then superposed such that the applied carbon-based conductive material solution lies between them, producing a laminate sheet. Various lamination processes are possible. The materials can be simply stacked, but it is preferable to compress them through passage between rolls or other means in order to produce reliable adhesion at the lamination interface.

Next, the laminate sheet so obtained is subjected to a procedure to remove the dispersion medium from the carbon-based conductive material solution layer. Various methods of removal are possible; the preferred method is to remove the dispersion medium through hot air drying. The hot air temperature should be selected so as to approximate the boiling point of the dispersion medium. Removing the dispersion medium through drying or other process results in the formation of a carbon-based conductive material consisting of the binder and the conductive material; this has the effect of bonding the collector layer and the polarizable electrode layer together.

The foregoing discussion described an embodiment in which a single polarizable electrode material sheet and a single collector are laminated. Lamination of a polarizable electrode material sheet to each side of the collector would be performed analogously. For example, a process in which a polarizable electrode material sheet is laminated to one side of the collector, and another polarizable electrode material sheet is laminated to the other side of the collector using an analogous procedure, or a single-step lamination process in which one polarizable electrode material sheet is laminated each side of the collector, could be used.

Polarizable electrodes so obtained are disposed in opposing pairs while interposing a separator between the polarizable electrodes, producing a single unit. The electrolyte is injected, and the assembly is sealed within a container to produce the electric double layer capacitor which pertains to the present invention. An electric double layer capacitor can alternatively be produced by disposing a plurality of polarizable electrode/separator units in an row arrangement, injecting the electrolyte, and sealing the assembly within a container. In such an arrangement, it is not necessary to use the polarizable electrode which pertains to the present invention for the polarizable electrodes located at the two ends of the row of polarizable electrodes. That is, it is only necessary] to use the polarizable electrode which pertains to the present invention, wherein the polarizable electrode layers are laminated to both sides of the collector layer while imposing a carbon-based conductive material such that the carbon-based conductive material penetrates into the pores of the polarizable electrode layers, where a polarizable electrode is to be disposed next to another polarizable electrode with a separator placed between them.

EXAMPLES

The present invention will be described in further detail below through working examples.

Example 1

A polarizable electrode assembly was made as follows, with reference to FIG. 4:

To a mixture consisting of 85 wt % activated carbon powder (specific surface area 2200 m²/g; average particle size 7 microns), 7 wt % kitchen black, and 8 wt % polytetrafluoroethylene was added ethanol as a lubricant. Subsequently, the materials were mixed together, ram-extruded into sheet form and calendered to produce a sheet 1 of polarizable electrode material 10 cm wide and 0.8 mm thick. The sheet had a pore volume of 66% and 18 μm maximum pore size (measured according to ASTM-E-128-61 using the ethanol bubble point).

High-purity aluminum foil 50 microns thick and 15 cm wide was used for the collector 2.

Figure 5:
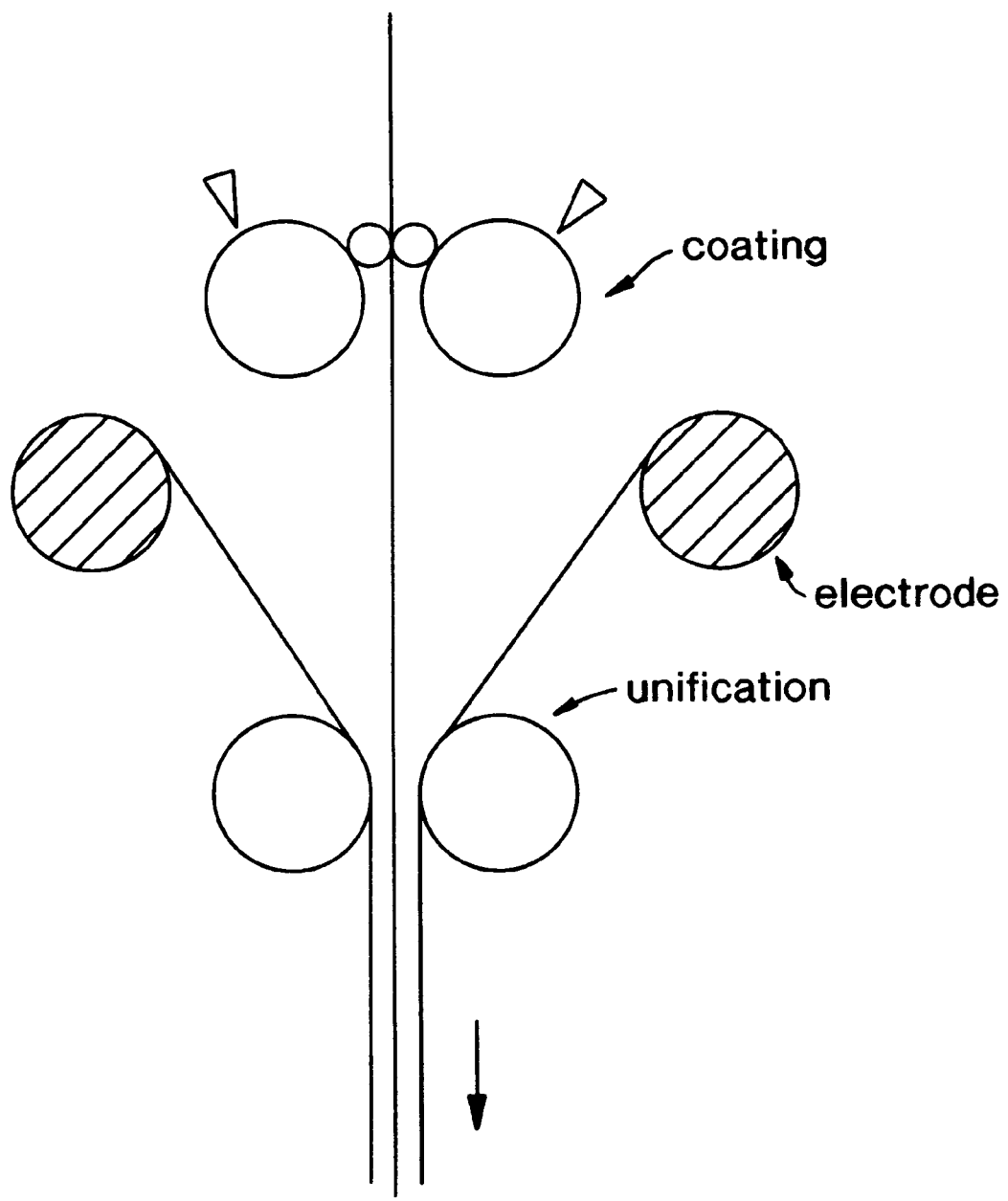
FIG. 5 is a schematic diagram of another embodiment of a process for making the present invention.

A layer 3 of an electrically-conductive adhesive material solution, 30 wt % natural graphite (average particle size 3 μm) as the conductive material, 8 wt % carboxymethyl cellulose Na salt as the binder, 60 wt % water, and 2 wt % ammonia was coated on one surface of the collector sheet 2 by passage through coating rolls 21, 22. After applying the conductive material solution, the aforementioned continuous polarizable electrode material sheet was superposed onto the coated portions of the high-purity aluminum foil collector, and the assembly was passed through compression rolls 23,24 to produce a 3-layer laminated sheet in which a portion of the electrically-conductive adhesive solution 3 was forced into the pores of the surface region of the sheet 1 and form a layer on the surface of sheet 1 to form a bond to the collector sheet 2. This procedure of coating with conductive material solution and applying the polarizable electrode was then repeated for the opposite side of collector 2. In an alternative method, both sides of collector 2 may be coated simultaneously as depicted in FIG. 5.

The laminate sheet was then fed into a continuous hot air drier (drying temperature set to 110° C.) at a speed such that the residence time was three minutes, thereby removing the dispersion medium form the conductive material solution. This procedure afforded a polarizable electrode sheet having the constitution depicted in FIG. 1. The sheet comprised polarizable electrode sheet layers 1 adhesive-laminated to both sides of the collector layer through the interposed carbon-based conductive material 3. The carbon-based conductive material 3 penetrated into the pores in the polarizable electrode sheet layers 1.

The electrically-conductive adhesive material solution was present in an amount of 20 g/square meter and the thickness of the electrically-conductive adhesive material was about 10 microns (excluding the amount that penetrated into the polarizable electrode).

The sheet was punched into 10 cm squares to produce polarizable electrodes 4 of sheet form. As shown in FIG. 2, a pair of polarizable electrodes 4 was disposed in opposing fashion, interposing a separator 5. A collector terminal 9 (2 cm×4 cm) and a collector lead 7 were attached to the collector layer 2 of one of the polarizable electrodes 4, and collector terminal 9' (2 cm×4 cm) and a collector lead 7' were attached to the collector layer 2 of the other polarizable electrode 4, producing a single unit.

Next, as shown in FIG. 3, polarizable electrodes and separators were disposed in a row to produce a total of 13 units. This assembly was vacuum dried for three hours at 200° C. and then placed in an aluminum case 6. The positive terminal, negative terminal, and lid 12 were attached. An electrolyte 10 consisting of a 1 molar concentration tetraethylammonium tetrafluoroborate propylene carbonate solution was injected and the case 6 was sealed to produce a square electric double layer capacitor.

Example 2

A square electric double layer capacitor was produced following the procedure of Working Example 1, with the exception that the carbon-based conductive material solution consisted of 30 wt % acetylene black (average particle size 40 μm), 8 wt % carboxymethyl cellulose Na salt, 60 wt % water, and 2 wt % ammonia.

Comparative Example 1

A square electric double layer capacitor was produced following the procedure of Working Example 1, with the exception that the carbon-based conductive material solution consisted of 30 wt % natural graphite (average particle size 60 μm), 8 wt % carboxymethyl cellulose Na salt, 60 wt % water, and 2 wt % ammonia.

In the polarizable electrodes in this electric double layer capacitor, the natural graphite particle size was larger than the polarizable electrode sheet pore size (and due to the particle size distribution, more of such large particles were present), and as a result the material did not penetrate sufficiently into the voids of the polarizable electrode layers.

Comparative Example 2

A square electric double layer capacitor was produced following the procedure of Working Example 1, with the exception that the sheet constituting the polarizable electrode layers was 10 cm wide and 0.8 mm thick, and exhibited 66% porosity and 30 μm maximum pore size.

In the polarizable electrodes in this electric double layer capacitor, the polarizable electrode sheet pore size was too large relative to the carbon-based conductive material particle size; the carbon-based conductive material thus penetrated far into the voids, with the result that only a small amount of the carbon-based conductive material stayed at the collector-polarizable electrode contact interface.

Comparative Example 3

A square electric double layer capacitor was produced following the procedure of Working Example 1, with the exception that high-purity aluminum foil having a roughened metal foil surface was employed as the collector, and the laminate sheet was prepared by roll-calendering conducted so as to form the polarizable electrode layers directly on both sides thereof without interposing a carbon-based conductive material.

Comparative Example 4

A square electric double layer capacitor was produced following the procedure of Working Example 1, with the exception that high-purity aluminum expanded metal (dimensions 1.0 mm SW (short width), 2.0 mm LW (long width), St (strand width) 0.23 mm, t (original thickness) 80 microns) was employed as the collector, and the laminate sheet was prepared by roll-calendering conducted so as to form the polarizable electrode layers directly on both sides thereof without interposing a carbon-based conductive material.

The capacitance and internal resistance of the electric double layer capacitors prepared in Working Examples 1 and 2 and Comparative Examples 1 through 4 were measured on double layer capacitor assemblies of the type described in connection with FIG. 3. The capacitance was determined by discharging at the current of 1 mA/square centimeter from 2.5 V to 0 V. The internal resistance was obtained by measuring the impedance at 100 kHertz. Results are given in Table 2.

TABLE 2

|  | Polarizable electrode | | Characteristics | | | |
| --- | --- | --- | --- | --- | --- | --- |
|  | Max. pore size in polarizable electrode layer (μm) | Conductive material pore size (μm) | Internal resistance (mΩ) | Capacitance (F) | Volume | Capacitance per unit of volume (F/cc) |
| Working Ex. 1 | 18 | 7 | 16 | 4300 | 460 | 9.3 |
| Working Ex. 1 | 18 | 40 | 16 | 4300 | 460 | 9.3 |
| Compar. Ex. 1 | 18 | 60 | 19 | 4300 | 460 | 9.3 |
| Compar. Ex. 2 | 30 | 7 | 19 | 4210 | 460 | 9.2 |
| Compar. Ex. 3 | — | — | 19 | 4300 | 460 | 9.3 |
| Compar. Ex. 4 | — | — | 23 | 4300 | 460 | 9.3 |

As may be seen from Table 2, the electric double layer capacitor which pertains to the present invention provides an electric double layer capacitor that exhibits low internal resistance. In contrast, electric double layer capacitors employing either polarizable electrodes having no interspersed carbon-based conductive material (Comparative Examples 3 and 4) or polarizable electrodes in which the carbon-based conductive material either does not adequately penetrate into the voids in the polarizable electrode layers, or does not remain in sufficient quantities at the polarizable electrode layer-collector layer interface (Comparative Examples 1 and 2) exhibit high internal resistance and low capacitance.

The electric double layer capacitor which pertains to the present invention provides both high capacitance per unit of volume and low internal resistance. According to the method of the present invention the polarizable electrode can be manufactured as a continuous sheet, thereby affording excellent productivity.

Without intending to limit the scope of the present invention, the following examples illustrate how the present invention may be made and used:

While particular embodiments of the present invention have been illustrated and described herein, the present invention should not be limited to such illustrations and descriptions. It should be apparent that changes and modifications may be incorporated and embodied as part of the present invention within the scope of the following claims.

What is claimed is:

1. In an electric double layer capacitor having a collector layer and a polarizable electrode layer attached to one another, the improvement comprising an adhesive disposed between the collector layer and the polarizable electrode layer, said adhesive comprising electrically conductive carbon and a binder, wherein a portion of said adhesive is disposed within the pores of the polarizable electrode layer to a depth of about 0.15% to about 30% of the thickness of the polarizable electrode layer.

2. A method of attaching a polarizable electrode layer to a collector layer in an electric double layer capacitor comprising:

(a) providing an adhesive solution comprising electrically conductive carbon and a binder in a dispersion medium;

(b) disposing the adhesive solution between the polarizable electrode layer and the collector layer;

(c) laminating said polarizable electrode layer to the collector layer with the adhesive solution between them to form a laminate such that a portion of the adhesive is disposed within the pores of the polarizable electrode layer to a depth of about 0.15% to 30% of the thickness of the polarizable electrode layer; and (d) heating the laminate to remove the dispersion solution.

* * * * *